Sept. 18, 1962   L. CONE   3,054,302
GEAR SHIFT LEVER POSITIONING ATTACHMENT
Filed Jan. 6, 1960   2 Sheets-Sheet 1
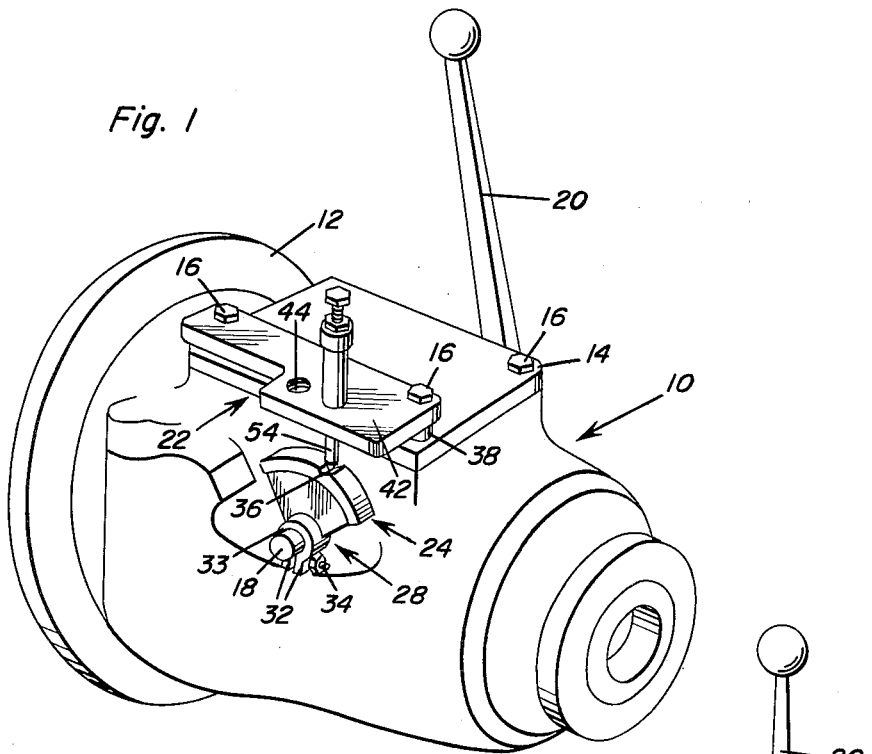
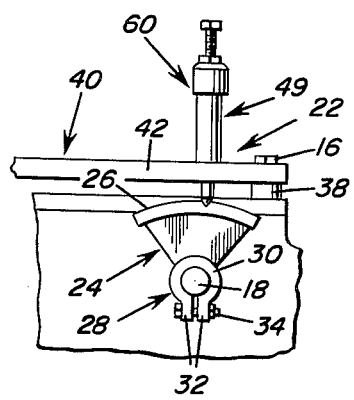
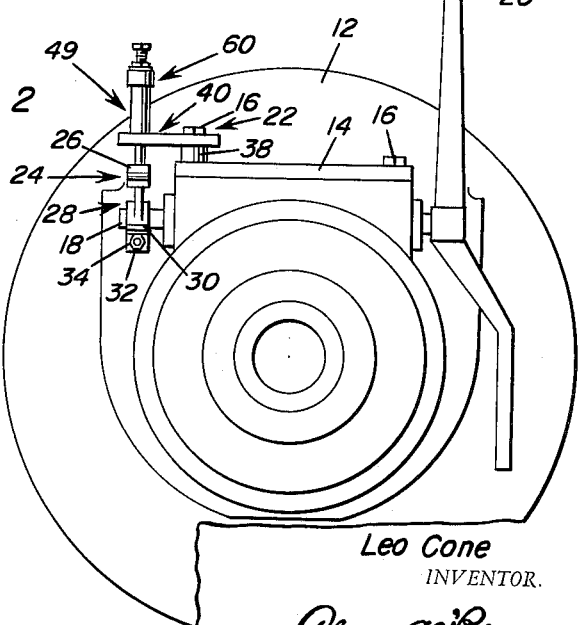
Leo Cone
INVENTOR.

Sept. 18, 1962    L. CONE    3,054,302
GEAR SHIFT LEVER POSITIONING ATTACHMENT
Filed Jan. 6, 1960    2 Sheets-Sheet 2
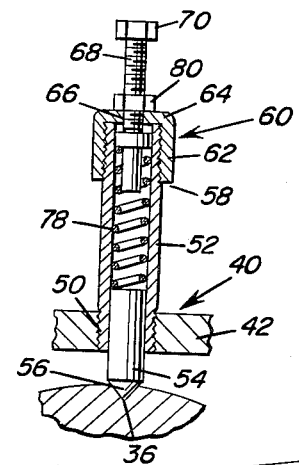
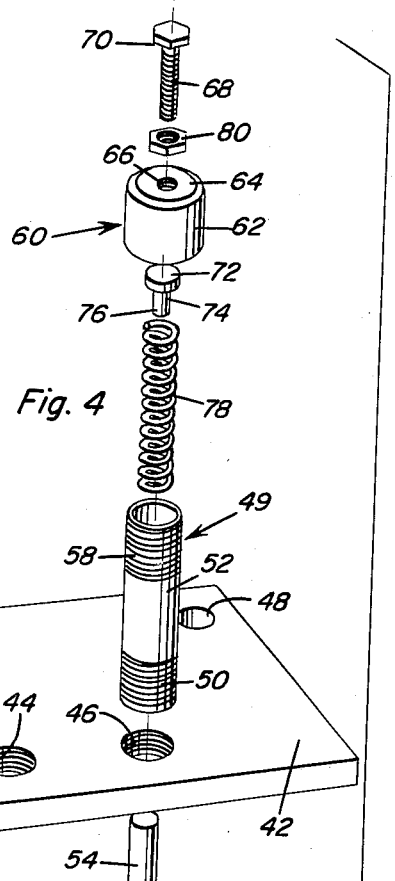
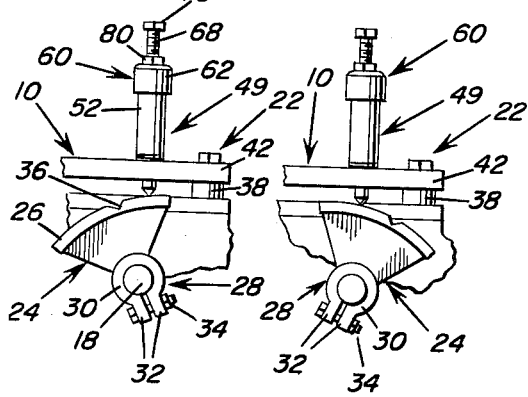
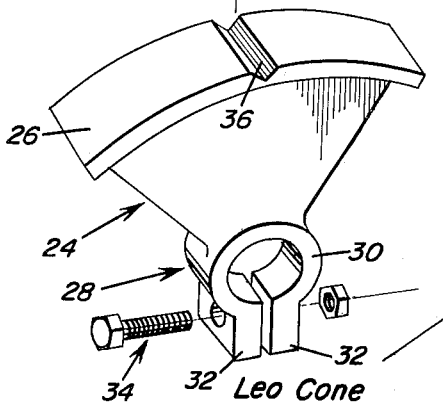
Leo Cone
INVENTOR.
BY Clarence A. O'Brien
and Harvey B. Jacobson
Attorneys

United States Patent Office 3,054,302
Patented Sept. 18, 1962

3,054,302
GEAR SHIFT LEVER POSITIONING ATTACHMENT
Leo Cone, 1414 Clement St., San Francisco, Calif.
Filed Jan. 6, 1960, Ser. No. 723
2 Claims. (Cl. 74—475)

This invention relates to a novel and useful gear shift lever positioning attachment, and more particularly to a gear shift lever positioning attachment which is specifically adapted for use with marine type transmissions.

Because of the particular construction of the marine type transmission and clutch, it is sometimes very difficult to position the gear shift lever of a marine transmission in the neutral position and have it remain in that neutral position so that the propeller of the ship in which the transmission is secured will not turn when it is desired to maintain the ship at a standstill. Although slight mispositioning of the gear shift lever of a marine transmission can result in the propeller turning, it does not necessarily turn at the speed it would turn if the gear shift lever were positioned fully in the drive position. If this situation exists, the captain or operator of a ship is not always aware that the propeller is turning and accidents have been caused by the motor of a ship being speeded up while the transmission was thought to be in the neutral position while actually being partially in one of the drive positions. The result of a marine transmission being partially in gear when the motor is speeded up is not unlike that when the accelerator pedal of an automobile is accidentally depressed with the automatic transmission thereof being in one of the drive positions.

Although many means have been devised by ship owners for determining the exact positioning of the gear shift lever including the provision of scribe marks or the like immediately adjacent the travel of the shift lever for indicating the exact positioning of the neutral gear position, these attempts have proven unsuccessful inasmuch as a large majority of ships equipped with transmissions have remote controls which necessarily have a certain amount of slack or play in the linkage therefore rendering the exact positioning of the shifting lever on the transmission in response to the exact positioning of the remote shifting lever next to impossible. Further, even if the exact positioning of the gear shift lever of the transmission could be obtained from a remote position, the gear shift levers on marine transmissions sometimes have a tendency to creep out of neutral position and into a drive gear.

The main object of this invention is to provide a means for determining the exact positioning of the gear shift lever of a marine transmission when in the neutral position whether or not the shift lever on the marine transmission itself is being manipulated or whether it is being operated from a remote position.

Another object of this invention, in accordance with the preceding object, is to provide a means for releasably retaining the gear shift lever of a marine transmission in the neutral position in a manner whereby that neutral position may be obtained through touch rather than sight.

Still another object of this invention is to provide a marine transmission gear shift lever positioning attachment which will retain the gear shift lever in a neutral position against any tendency of the lever itself to move out of the neutral position before the shift controls are motivated by a remote source of energy.

A final object to be specifically enumerated herein is to provide a gear shift lever positioning attachment which will conform to conventional forms of manufacture, be of durable construction and extremely simple in operation so as to provide a device which will be economically feasible, long lasting and operable with extreme accuracy by substantially every person capable of operating the ship in which the attachment is secured.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a conventional form of marine transmission and bell housing with the gear shift lever positioning attachment comprising the present invention shown mounted in an operational position thereon and with the gear shift lever in the neutral position;

FIGURE 2 is a rear end elevational view of the marine transmission shown in FIGURE 1 on somewhat of an enlarged scale with the gear shift lever positioning attachment secured thereto;

FIGURE 3 is an enlarged fragmentary vertical sectional view taken substantially through the longitudinal center line of the spring detent means of the attachment showing the details of its construction;

FIGURE 4 is an exploded perspective view of the attachment on somewhat of an enlarged scale;

FIGURE 5 is a fragmentary side elevational view shown with an attachment mounted in operational position thereon and with the shifting shaft of the transmission in the neutral position;

FIGURE 6 is a fragmentary side elevational view of the marine transmission similar to FIGURE 5 but showing the shifting shaft of the transmission in the forward drive position; and FIGURE 7 is a fragmentary side elevational view similar to FIGURES 5 and 6 but with the shifting shaft of the transmission shown in the reverse drive position.

Referring now more specifically to the drawings the numeral 10 generally designates a conventional form of marine transmission and clutch assembly including a bell housing 12 for mounting the transmission to a suitable power source (not shown). The transmission 10 includes a top inspection or access plate 14 which is secured over an opening (not shown) by means of fasteners 16. Projecting through opposite sides of the transmission 10 are the remote ends of the shifting or rock shaft 18. It is to be understood that most marine transmissions are provided with a shifting or rock shaft similar to shaft 18 and that in most cases the rock shaft projects from both sides of the transmission. However, inasmuch as the motors and transmissions of the ships are mounted in various positions throughout the hull and various types of remote shifting mechanisms are used so that the transmission may be operated from a remote position in the ship, the rock shaft projects from both sides of the transmission enabling the shifting lever to be secured to either end of the shaft which naturally provides various manners in which the remote shifting mechanism may be secured to the shifting or rock shaft. Further, even though the ship may be provided with means for remotely shifting the transmission, there is invariably a shifting lever secured to the shifting shaft of the transmission so that the latter may be moved through different gears from a point immediately adjacent the transmission.

Inasmuch as the securement of the shift lever to one end of the shifting shaft of the transmission uses most of the available area immediately adjacent that end of the shifting shaft, the present invention, comprising an attachment for correctly positioning the shifting shaft of the transmission in a neutral position, is specifically adapted for securement to the end of shifting shaft remote from the shifting lever which is secured thereto.

With particular attention now directed to FIGURES 1 and 2 of the drawings, it will be noted that one end of the shifting shaft 18 has a shift lever 20 secured thereto for manipulation to rotate the shifting shaft and change the position of the gears in the transmission. As previously pointed out, the shifting lever 20 may or may not be provided with means for shifting the transmission 10 from a remote position.

The gear shift lever positioning attachment is generally designated by the reference numeral 22 and it will be noted that it includes the provision of a quadrant generally referred to by the reference numeral 24. The quadrant 24 includes an arcuate surface 26 and is removably secured to the corresponding end of the shifting shaft 18 by means of a split clamp assembly generally referred to by the reference numeral 28. The split clamp assembly 28 includes a split sleeve 30 provided with adjacent and confronting outwardly extending apertured ears 32 which are urged together to clampingly engage the sleeve 30 with the adjacent end of the shifting shaft 18 by means of a thrust fastener 34 secured through the apertured ears 32. The arcuate surface 26 of the quadrant 24 is provided with a transversely extending V-shaped notch 36 whose purpose is to be hereinafter more fully set forth.

Secured in overlying relation to a portion of the inspection or access plate 14 in spaced relation thereto by means of spacers 38 is a support bracket generally referred to by the reference numeral 40. The support bracket 40 is secured in spaced relation to the inspection or access plate 14 in order to provide sufficient clearance between the under surface thereof and the arcuate surface 26 of the quadrant 24 and also to insure that any rough portions of the upper surface of the inspection or access plate 14 will not interfere with the mounting of the support bracket thereon. The support bracket 40 includes a flange portion 42 directly overlying the quadrant 24 which is provided with a pair of threaded bores 44 and 46. It is to be noted that the support bracket 40 is also provided with a pair of smooth bores which are adapted to receive the shank portions of the fasteners 16 for securing the support bracket 40 to the inspection or access plate 14.

Secured in one of the threaded bores 44 or 46 is the lower threaded end portion 50 of a cylindrical guide element 52. Slidably disposed in the lower end of the guide element 52 and projecting below the lower surface of the flange portion 42 of the support bracket 40 is a plunger 54 having a conical end 56. Secured to the threaded upper portion 58 of the guide element 52 is a stop assembly generally designated by the reference numeral 60. The stop assembly 60 comprises an internally threaded cap 62 threadedly engaged with the upper threaded portion 58 of the guide element 52 which is provided with an upper end wall 64 having a threaded aperture 66 formed therein for receiving the threaded shank 68 of the adjustment screw or bolt 70. The adjustment bolt 70 has its shank portion 68 partially secured through end wall 64 and the head 72 of adjustment pin 74 having a diametrically reduced shank portion 76 is disposed beneath the lower end of the shank 68. The upper end of a coiled compression spring 78 is disposed about the shank portion 76 of the adjustment pin 74 and abuts against the under surface of the head 72 thereof while the lower end of the compression spring 78 abuts against the upper surface of the plunger 54 to yieldably urge the latter down on the arcuate surface 26 of the quadrant 24.

In operation, the attachment 22 is secured to the transmission assembly 10 as heretofore set forth and the quadrant 24 is adjusted in rotated position relative to the shifting shaft 18 to position the notch 36 in alignment with the plunger 54 when the shifting shaft 18 is in the neutral position. Thus, upon the seating of the conical end 56 of the plunger 54 within the notch 36 a person manipulating either the shift lever 20 or linkage secured thereto and operated from a remote position will be able to feel by touch when the quadrant 24 and thus the shifting shaft 18 is positioned in the neutral position. It is to be noted that upon the adjustment of the adjustment bolt 70 through the threaded aperture 66 that the tension of the compression spring 78 may be adjusted. After the adjustment bolt is correctly positioned, jamb nut 80 may be used to retain the adjusting bolt 70 in position.

It is to be understood that the tension of the compression spring 78 will be sufficient to urge the plunger 54 into engagement with the notch 36 with sufficient thrust to maintain the quadrant 24 and thus the shifting shaft 18 in the neutral position against any tendency of the transmission assembly 10 itself to move the shifting shaft out of the neutral position.

The threaded bore 44 may be used to position the detent means 49 in different positions relative to the support bracket 40 so that the latter may be positioned on the opposite side of the transmission or so that the shifting shafts 18 of transmissions may be compensated for in the position of the detent means.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a marine transmission housing including a shifting rock shaft extending through and projecting from opposite sides of said housing and having similar opposite end portions, an operating lever removably secured to a selected one of said end portions for manipulation to oscillate said shaft and shift the shaft between forward and reverse positions and a neutral position therebetween, a gear shift positioning attachment, functioning to yieldably retain said lever in a neutral position between forward and reverse positions of rotation of said shaft comprising a bracket plate including a flange portion, means removably securing said bracket plate to said housing with said flange portion disposed beyond a selected one of the sides of said housing and overlying the corresponding one of said shaft end portions, said lever being secured to the other of said end portions, a quadrant having an arcuate surface thereon, means removably securing said quadrant to said one end portion of said shaft for rotation therewith and with the center of said arcuate surface being substantially in coincidence with the axis of rotation of said shaft, said arcuate surface having a recess formed therein, detent means carried by said bracket plate flange portion engageable with said recess for releasably retaining said quadrant in position with the shaft in neutral position, said last mentioned securing means including a split clamp assembly removably and clampingly engaging said one end portion of said shaft whereby said quadrant may be secured to the other end portion of said shaft and in selected rotated positions relative to said shaft, said flange portion having a bore formed therethrough generally aligned with the adjacent end portion of said shaft, a tubular guide having one end supported from said bracket plate with the longitudinal axis of said guide generally aligned with the end portion of said shaft and extending transversely thereof, said detent means comprising a plunger slidably disposed in the end portion of said tubular guide adjacent said quadrant, stop means secured to the other end of said guide and resilient thrust means disposed between said stop means and said plunger normally resiliently urging the latter toward said quadrant.

2. The combination of claim 1 wherein said stop means includes an adjustable stop element movable toward and away from said plunger.

References Cited in the file of this patent

UNITED STATES PATENTS

| | | |
|---|---|---|
| 734,822 | Cooley | July 28, 1903 |
| 871,110 | Comings | Nov. 19, 1907 |
| 968,468 | Halbleib | Aug. 23, 1910 |
| 1,172,881 | Dodge | Feb. 22, 1916 |
| 1,591,089 | Ingebritson | July 6, 1926 |
| 2,233,188 | Ward | Feb. 25, 1941 |
| 2,529,182 | Panish | Nov. 7, 1950 |
| 2,542,145 | Kehle | Feb. 20, 1951 |
| 2,748,910 | Klecker | June 5, 1956 |
| 2,826,283 | Morse | Mar. 11, 1958 |
| 2,975,650 | Hollyday | Mar. 21, 1961 |

FOREIGN PATENTS

| | | |
|---|---|---|
| 8,532 of 1910 | Great Britain | Apr. 8, 1910 |
| 12,494 of 1912 | Great Britain | May 25, 1912 |